United States Patent [19]

Yang

[11] Patent Number: 5,079,665
[45] Date of Patent: Jan. 7, 1992

[54] OPERATING MODE DISCRIMINATING DEVICE FOR A MAGNETIC TAPE RECORDING AND/OR REPRODUCING APPARATUS

[75] Inventor: Dae-oh Yang, Anyang, Rep. of Korea

[73] Assignee: SamSung Electronics Co., Ltd., Suwon, Rep. of Korea

[21] Appl. No.: 503,900

[22] Filed: Apr. 4, 1990

[30] Foreign Application Priority Data

Jul. 24, 1989 [KR] Rep. of Korea .................. 89-10699

[51] Int. Cl.⁵ .............................................. G11B 15/00
[52] U.S. Cl. ........................................ 360/137; 360/93
[58] Field of Search .................. 360/137, 93, 96.1–96.4

[56] References Cited

U.S. PATENT DOCUMENTS 4,672,476  6/1987  Saito ...................................... 360/85
4,674,001  6/1987  Takahashi et al. ................... 360/137

Primary Examiner—David J. Severin
Attorney, Agent, or Firm—Robert E. Bushnell

[57] ABSTRACT

An operating mode discriminating device for a magnetic tape recording and/or reproducing apparatus which adopts an optical detecting elements is disclosed. As the device has non-contacting type detecting elements, there arises no contacting problems and an accurate determination of the operating mode can be ensured.

12 Claims, 4 Drawing Sheets ated by the programmable switch in FIG. 1, corresponding to each operating mode,
OPERATING MODE DISCRIMINATING DEVICE FOR A MAGNETIC TAPE RECORDING AND/OR REPRODUCING APPARATUS

FIELD OF THE INVENTION

The present invention relates to an operating mode discriminating device for a magnetic tape recording and/or reproducing apparatus, particularly to a device which adopts optical detecting means.

BACKGROUND OF THE INVENTION

A magnetic tape recording and/or reproducing mechanism is disclosed in U.S. Pat. No. 4,672,476, for example. The mechanism comprises one or more cam(s) which are driven by a motor and operating members which are operated by the cam(s), and the operating mode of the mechanism is changed to various modes, for example, EJECT, PLAY, FF/REW, REV, PAUSE, according to the relative positions of the operating members. Here, the motor is precisely controlled by a servo control circuit which is controlled in turn by a microprocessor.

The microprocessor receives both commands to make the mechanism's and peripheral circuits to be operated at the user's direction, and detected information for the mechanism state to protect the mechanism and the magnetic tape from an abnormal operation. Upon receipt of the user's command through keyboard or remote control input, the microprocessor provides a control signal to the servo control circuit of the drive motor for changing the state of the mechanism to execute the commanded mode. After changing the state of the mechanism to the commanded operating mode, the microprocessor completes the output of a control signal upon receipt of detected information from the detecting means for the state of the mechanism.

Therefore, with the above mentioned U.S. Pat. No. 4,672,476 magnetic tape recording and/or reproducing apparatus or drive mechanism to execute multiple modes, a detecting stage for the state of the mechanism is generally provided.

As the detecting means, a programmable switch having multiple contacts or a plurality of a switches having a single contact has been generally used. Such a programmable switch may be a conventional slide or rotary type switch.

In FIG. 1 and FIG. 2, a conventional slide type programmable switch and timing charts of its switching signals are illustrated. The programmable switch consists of a base plate 1 in which a plurality of contact bands 1a, 1b, 1c, 1d are arranged in parallel; a contact 2 having a plurality of contact wiper portions 2a, 2b, 2c, 2d each of which corresponds to the contact bands 1a, 1b, 1c, 1d, respectively; and a slider 3 for moving the contactor 2. The slider 3 is further connected to the actuator 4 which reciprocates along the predetermined stroke according to changes of the operating mode by a drive mechanism (not shown). When the slider 4 is displaced by the actuator 4, the contactor 2 connected thereto is displaced together, thereby making electrical contacts between the contacting bands 1a, 1b, 1c, 1d and the contacting portions 2a, 2b, 2c, 2d, respectively.

Here, three contacting bands 1b, 1c, 1d excluding the single contacting band 1a for grounding are formed in a predetermined pattern so that only the hatched portions make contact with the contacting portions 2b, 2c, 2d. Therefore, switching pulses or signals of high or low level are generated at the contacting bands 1b, 1c, 1d excluding band 1a according to the position of the contactor 2, and the detected signals for determining the status of the mechanism to execute specific operating modes are output by combining the switching pulses.

In the above mentioned conventional programmable switch, the contacting force between each of the contact elements should be maintained in an adequate range to generate proper detected signals, but a loose contact may occur by wear and tear as with time passing-by, thereby causing an erroneous operation of the mechanism.

SUMMARY OF THE INVENTION

Therefore, it is an object of the present invention to overcome the problems in the prior art, and provide a mode discriminating device which can generate accurate switching signals and thereby make it possible to determine the state of the mechanism without failure.

To achieve these and other objects, the operating mode discriminating device for a magnetic tape recording and/or reproducing apparatus according to the present invention comprises:

a light intercepting means for selectively intercepting a plurality of light beam paths by moving to predetermined positions upon changing of the operating mode;

a light detecting means having couples of a light emitting element and light receiving element, each of said couples having a light beam path, and outputting detected signals through the light intercepting means;

a mode discriminating means for discriminating changed operating mode on receiving said detected signals from said light detecting means.

BRIEF DESCRIPTION OF THE DRAWINGS

The above and other objects and features of the invention will become more apparent from the detailed description referring to the accompanying drawings in which.

DETAILED DESCRIPTION OF THE PREFFERED EMBODIMENT

Figure 1:
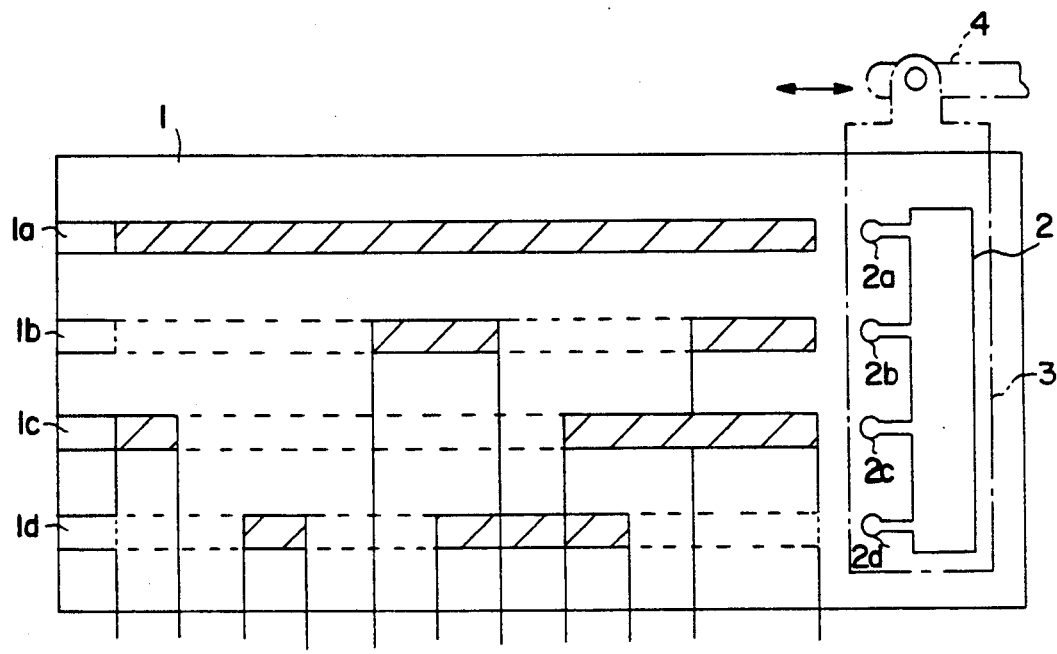
FIG. 1 is a schematic top plan view showing the convention slider type programmable switch adopted for determining the operating mode.
Figure 2:
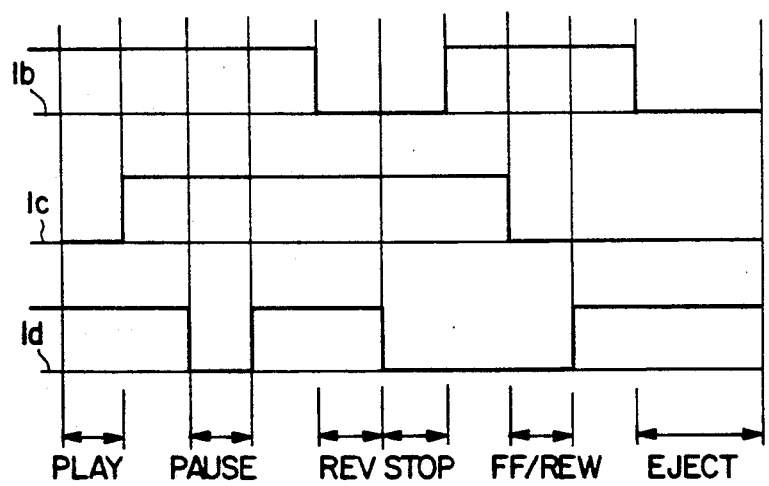
FIG. 2 is a timing chart of the switching pulses generated by the programmable switch in FIG. 1, corresponding to each operating mode.
Figure 3:
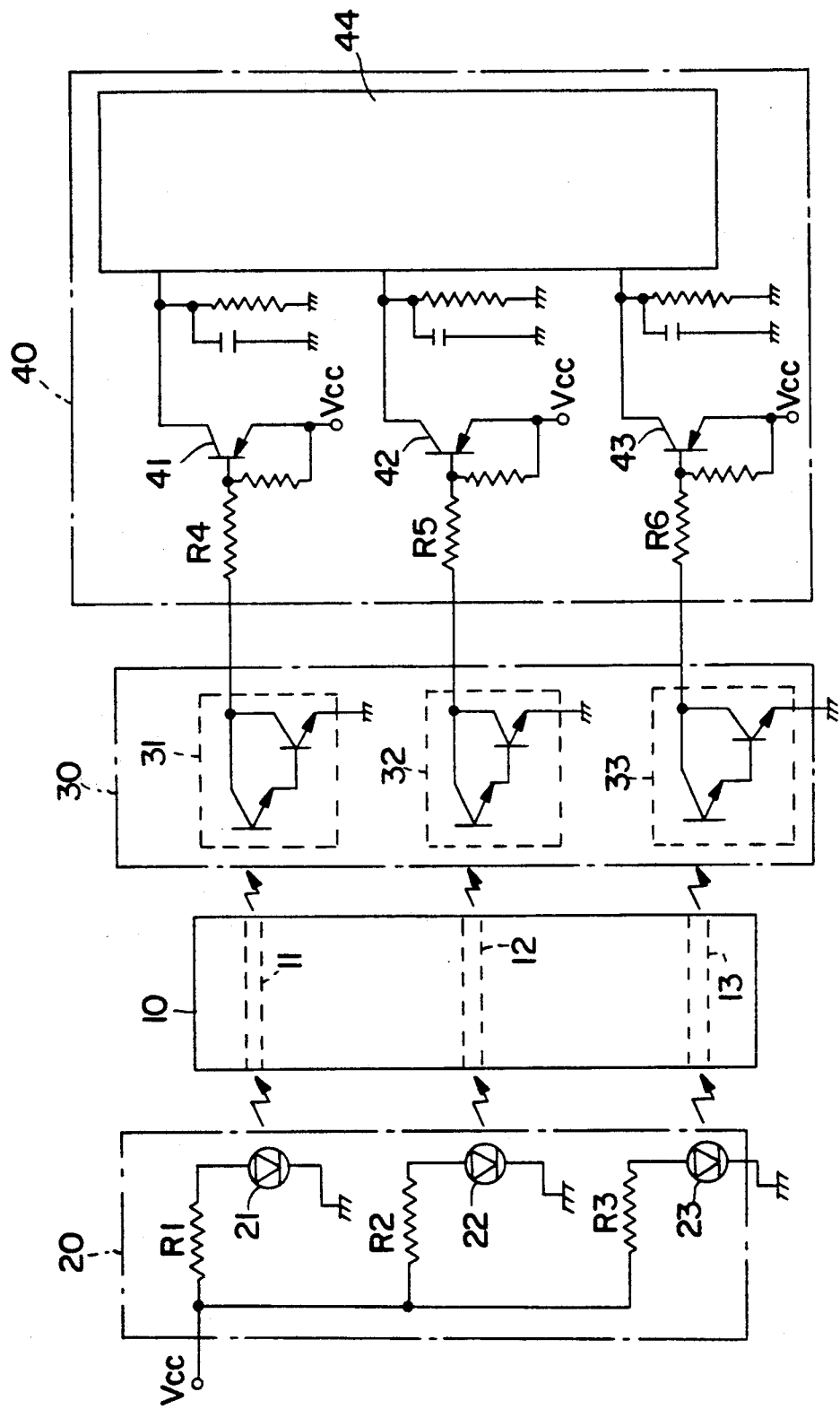
FIG. 3 is a circuit diagram of the operating mode discriminating device according to the present invention.

Referring to FIG. 3, a couple of light emitting portion 20 and light receiving portion 30 are provided with a plurality of light passing holes 11, 12, 13 as a light detecting means. The light emitting portion 20 has three light emitting elements 21, 22 and 23, each of which is connected to power supply terminal Vcc through the corresponding resistors R1, R2 and R3. When a driving voltage is applied to the power supply terminal Vcc, three light emitting elements 21, 22 and 23 respectively emit light beams in three different light paths. The light receiving portion 30 has three light receiving elements 31, 32 and 33, each of which becomes conductive when receiving a corresponding light beam emitted from the light emitting elements 21, 22, 23 through the light passing holes 11, 12, 13 of the light shutter 10.

A operating mode discriminating portion 40 comprises switching transistors 41, 42, 43, each of which has an emitter coupled to the power supply terminal Vcc, base electrode and collector coupled to the light receiving elements 31, 32, 33, and being turned on to produce inverted signals when the light receiving elements 31, 32, 33 become conductive; a microprocessor 44 which determines operating mode by the input signals from input terminals I1, I2, I3, each of which is respectively coupled to the collectors of the switching transistors.

Figure 4:
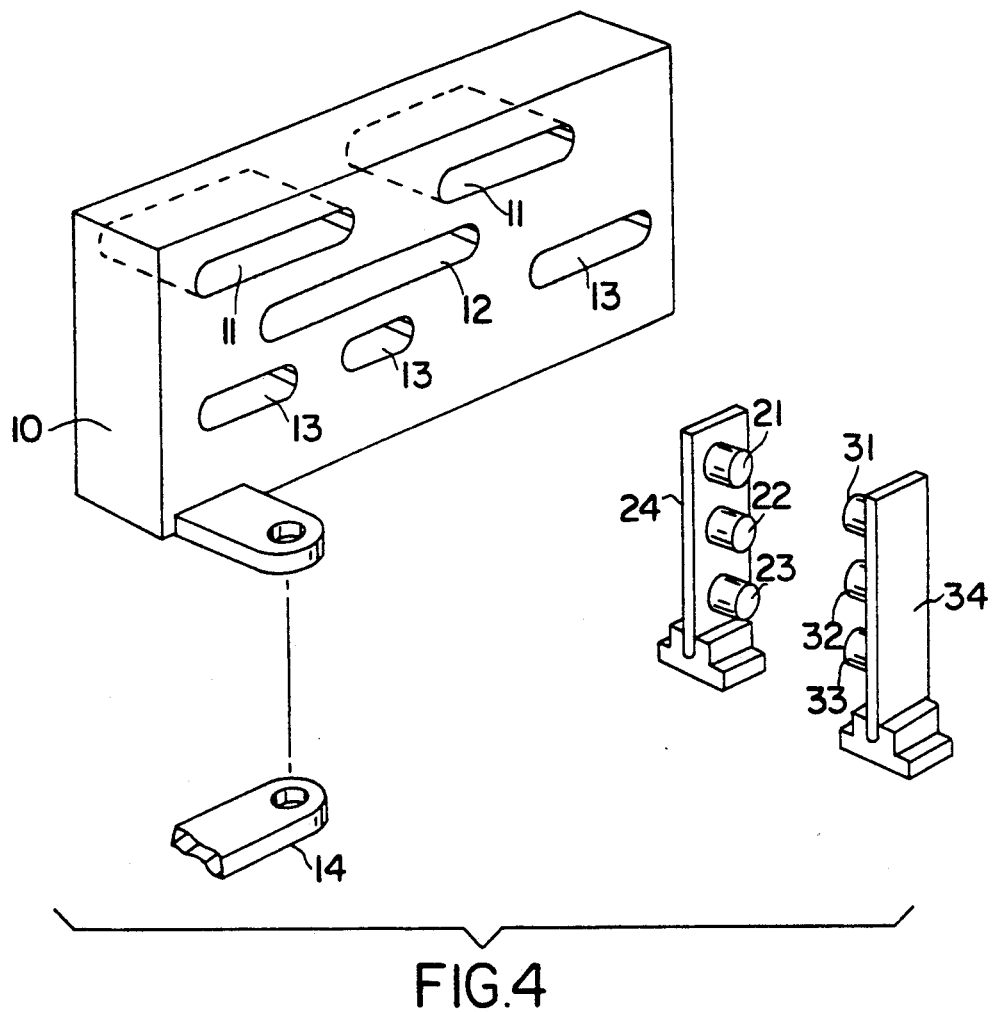
FIG. 4 is a perspective view of an operating mode discriminating device according to the present invention.

Referring to FIG. 4, three light emitting elements 21, 22, 23 are provided at different heights on one support 24, three light receiving elements 31, 32, 33, each of which respectively corresponds to the light emitting elements 21, 22, 23, provided at the other supportor 34, the two supports 24, 34 are located at a predetermined spacing. Resultantly, each of the light emitting elements 21, 22, 23 and corresponding ones of the light receiving elements 31, 32, 33 form three independent light beam paths, respectively.

A light shutter 10 having light beam passages holes 11, 12, 13 has sufficient size to intercept the three light beam paths, and is connected to the actuator 14 of a conventional driving mechanism (not shown) so as to be movable across the light beam paths to the predetermined position on the operating mode of the apparatus being changed.

Figure 5:
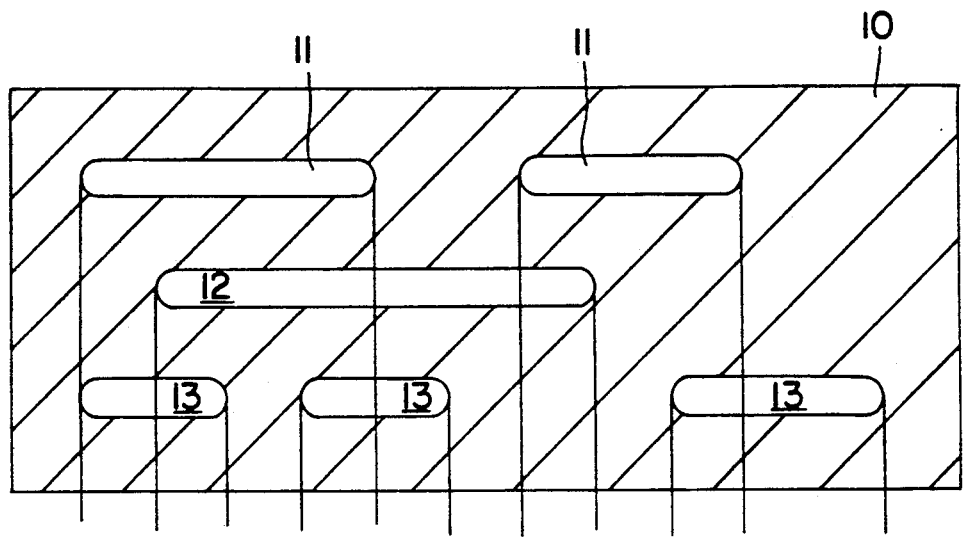
FIG. 5 is a vertical sectional view of the shutter adopted for the present invention.

FIG. 5 is a vertical sectional view showing light beam passages 11, 12, 13 of the light shutter 10, the light beam passing holes 11, 12, 13 are respectively formed in a predetermined pattern so that the light beams from the light emitting elements 21, 22, 23 may selectively pass through the holes. For example, such a arrangement may be formed in the similar patterns as that of the non-contacting portions which excludes the hatched portion from the contacting bands 1b, 1c and 1d.

Figure 6:
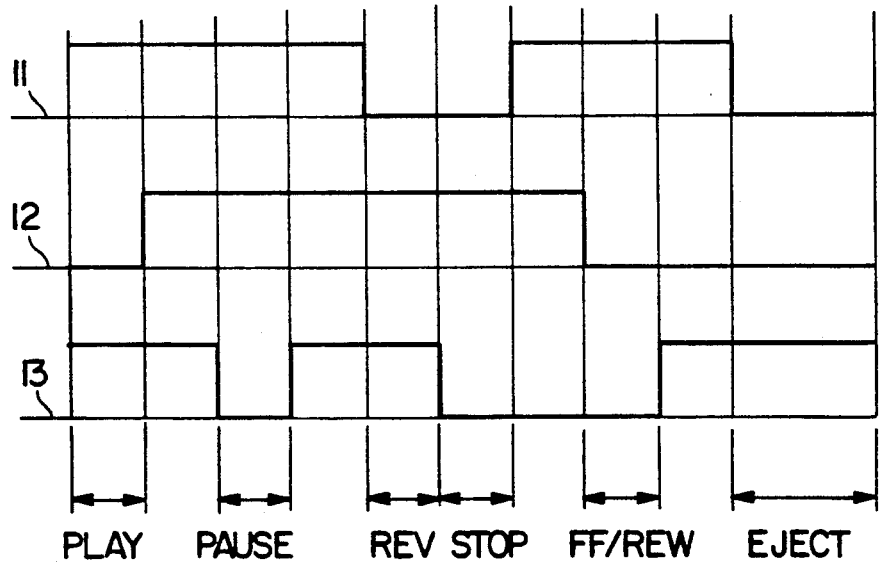
FIG. 6 is a timing chart of the operating mode discriminating signals dependent on the operating mode through the light passing holes in FIG. 5.

FIG. 6 shows the timing chart of input signals received at the input terminals I1, I2, I3 of the microprocessor 44 through light beam passages 11, 12, 13 of light shutter 10.

The operation of the above mentioned embodiment will now be described. The light shutter 10 is moved by the actuator 14 of the driving mechanism upon receipt of the operating mode changing command. If the light beam passing passages coincide with the light beam paths, the light receiving elements 31, 32, 33 become conductive by detecting light beams from light emitting elements 21, 22 and 23. Then, the inverted high level signal is supplied to the collectors of switching transistors 41, 42, 43, and also to the input terminals I1, I2, I3 of the microprocessor 44. But the portions other than light beam passages 11, 12, 13, the light beams cannot pass therethrough, then input terminals I1, I2, I3 are maintained in a low state.

The microprocessor 44 determines the operating mode of the apparatus by comparing received data through input terminals I1, I2 I3 with a stored combination of signals, the data are combinations of high level signals and low level signals corresponding to relative of light shutter 10.

The following Table 1 shows the positions of the light shutter 10 for various operating and combinations of signals of the input terminals I1, I2, I3 obtainable therefrom especially in a magnetic tape recording and-/or reproducing apparatus as an example.

TABLE 1

| Operating mode | Position of light shutter | Microprocessor | | |
|---|---|---|---|---|
| | | I1 | I2 | I3 |
| EJECT | EJECT | L | L | H |
| STOP | STOP | L | H | L |
| FF/REW | FF/REW | H | L | L |
| PLAY.REC.STILL FORWARD SEARCH REC PAUSE | PLAY | H | L | H |
| REVERSE SEARCH REC PAUSE | REVERSE | L | H | H |
| | PAUSE | H | H | L |

For example, if the operating mode of the apparatus is the EJECT mode, the light shutter 10 moves to the EJECT position thereby making the state of input terminals I1, I2, I3 of microprocessor 44 L, L, H. Thus, the microprocessor determines the present operating mode to be the EJECT mode.

As the present invention can provide a non-contacting type operating mode discriminating device which adopts optical detecting means using couples of light emitting/receiving elements for determining operating mode without any contacting errors due to wearing as occurs in conventional programmable switches and a precise driving control of the apparatus can be achieved, thereby improving the quality of the apparatus.

Although the preferred embodiment has been described, it is described only for illustrative purposes and not to limit the invention, and it is to be understood that various changes and modifications can be made without departing from the scope of the present invention. For example, the light shutter may be formed in the shape of disc or cam, and the arrangement of light beam passages may be duly changed according to the operating mode of a specific apparatus.

I claim:

1. An operating mode discriminating device for a magnetic tape recording and/or reproducing apparatus, comprising:

light intercepting means for selectively intercepting a plurality of paths of a plurality of light beams by moving to predetermined positions upon changing of the operating mode;

light detecting means having couples of a light emitting element and light receiving element, each of said couples forming one of said light beam paths, and outputting detected signals; and mode discriminating means for determining changes in operating mode upon receiving said detected signals from said light detecting means.

2. The device of claim 1, wherein said light emitting elements of said couples comprise:

means for generating said plurality of light beams; and means for positioning said generating means in a spaced-apart array with dimensions of separation of said generating means within said array conforming to corresponding dimensions of said light intercepting means.

3. The device of claim 1, wherein said light intercepting means is comprised of:

a shutter slidably disposed in juxtaposition to said light detecting means; and a plurality of spaced-apart means arranged for sequentially conducting said light beams through said shutter and to said light detecting means.

4. The device of claim 3, wherein said light emitting elements of said couples comprise:

means for individually generating said plurality of light beams; and means for positioning said generating means in a spaced-apart array with dimensions of separation of said generating means within said array conforming to corresponding dimensions of separation of said plurality of spaced-apart conducting means.

5. The device of claim 1, further comprised of means for positioning said light detecting means in a spaced-apart array in juxtaposition to said light intercepting means.

6. The device of claim 5, wherein said light intercepting means is comprised of:

a shutter slidably disposed in juxtaposition to said positioning means to travel between said predetermined positions; and a plurality of spaced-apart means arranged for sequentially conducting said light beams through said shutter and to said light detecting means, with distances of separation of said spaced-apart conducting means conforming to distances of separation of said light detecting means in said spaced-apart array.

7. The device of claim 1, further comprised of said light detecting means receiving said light beams via said light intercepting means.

8. The device of claim 7, wherein said light emitting elements of said couples comprise:

means for generating said plurality of light beams; and means for positioning said generating means in a spaced-apart array with dimensions of separation of said generating means within said array conforming to corresponding dimensions of said light intercepting means.

9. The device of claim 7, wherein said light intercepting means is comprised of:

a shutter slidably disposed in juxtaposition to said light detecting means; and a plurality of spaced-apart means arranged for sequentially conducting said light beams through said shutter and to said light detecting means.

10. The device of claim 9, wherein said light emitting elements of said couples comprise:

means for individually generating said plurality of light beams; and means for positioning said generating means in a spaced-apart array with dimensions of separation of said generating means within said array conforming to corresponding dimensions of separation of said plurality of spaced-apart conducting means.

11. The device of claim 7, further comprised of means for positioning said light detecting means in a spaced-apart array in juxtaposition to said light intercepting means.

12. The device of claim 11, wherein said light intercepting means is comprised of:

a shutter slidably disposed in juxtaposition to said positioning means to travel between said predetermined positions; and a plurality of spaced-apart means arranged for sequentially conducting said light beams through said shutter and to said light detecting means at said predetermined positions, with distances of separation of said spaced-apart conducting means conforming to distances of separation of said light detecting means in said spaced-apart array.

* * * * *